United States Patent [19]

Kase et al.

[11] Patent Number: 5,057,999
[45] Date of Patent: Oct. 15, 1991

[54] MICROPROCESSOR HAVING A PROTECTION CIRCUIT TO INSURE PROPER INSTRUCTION FETCHING

[75] Inventors: Kiyoshi Kase, Chiba; Minoru Suzuki, Tokyo, both of Japan

[73] Assignee: Nippon Motorola, Ltd., Tokyo, Japan

[21] Appl. No.: 370,980

[22] Filed: Jun. 26, 1989

[30] Foreign Application Priority Data

Aug. 5, 1988 [JP] Japan ............................ 63-194382

[51] Int. Cl.[5] ............................................. G06F 11/00
[52] U.S. Cl. .................................... 364/200; 364/265; 364/266.1; 364/266.2; 364/266.6
[58] Field of Search ... 364/200 MS File, 900 MS File; 371/16.3, 57.1, 67.1, 72

[56] References Cited

U.S. PATENT DOCUMENTS

| 4,317,171 | 2/1982 | Maejima et al. | 364/200 |
|---|---|---|---|
| 4,402,044 | 8/1983 | McDonough et al. | 364/200 |
| 4,441,154 | 4/1984 | McDonough et al. | 364/200 |
| 4,534,018 | 8/1985 | Eckert et al. | 365/228 |
| 4,534,030 | 8/1985 | Pacz et al. | 371/25 |
| 4,590,552 | 5/1986 | Guttag et al. | 364/200 |
| 4,667,087 | 5/1987 | Quintana | 235/380 |
| 4,685,056 | 8/1987 | Barnsdale, Jr. et al. | 364/200 |
| 4,727,549 | 2/1988 | Tulpule et al. | 371/62 |
| 4,763,296 | 8/1988 | Gercekci | 364/900 |
| 4,791,557 | 12/1988 | Angel et al. | 364/200 |
| 4,874,935 | 10/1989 | Younger | 235/492 |

*Primary Examiner*—Thomas C. Lee
*Assistant Examiner*—William M. Treat
*Attorney, Agent, or Firm*—Charles R. Lewis; Jordan C. Powell

[57] ABSTRACT

A microprocessor including a CPU, an instruction memory (ROM) with a sequencer in the CPU that sends out a fetch signal for an instruction, and an address decoder that decodes the fetch signal and sends a signal to the ROM allowing the fetch signal to fetch an instruction if the address is correct.

6 Claims, 3 Drawing Sheets

MICROPROCESSOR HAVING A PROTECTION CIRCUIT TO INSURE PROPER INSTRUCTION FETCHING

This invention relates to microprocessors and associated memories and is especially adapted for use with a single chip MCU. Single chip MCUs are utilized in IC cards, such as bank cards, credit cards, etc.

PRIOR ART

The closest known apparatus for protecting microprocessors from runaway is a "watchdog timer". Basically, a time-out timer is connected to the CPU of a microprocessor so as to reset the CPU if the timer is allowed to time-out. Each time the CPU fetches a new instruction from an associated memory the timer is reset. If the instruction is not completed by the CPU within the time-out time of the timer, it is assumed that something is wrong and the timer resets the CPU.

PROBLEMS THAT THE INVENTION IS TO SOLVE

A main problem caused by a watchdog timer" is that it prohibits execution of underfined instructions. Further, in the event of a low supply voltage condition, which often and easily happens in IC cards, the timer is one of the first circuits to be effected and, therefore, operation is effectively prohibited under these conditions.

Other problems which the present invention solves is that copy protection and reliability are increased and the probability of a wrong instruction fetch is decreased.

SUMMARY OF THE INVENTION

It is an object of the present invention to provide new and improved instruction fetch apparatus for use with a microprocessor.

It is a further object of the present invention to provide instruction fetch apparatus operating in conjunction with a microprocessor, which insures that only proper instructions are fetched by the CPU.

These and other objects are realized in a microprocessor including a CPU including means for fetching selected instructions from a memory, a memory for storing a plurality of instructions and connected to said CPU for supplying selected instructions in response to fetch signals, signal circuitry coupled to said memory and CPU for providing a second signal when a selected signal instruction is available for fetching, and logic circuitry connected to receive the fetch and second signals and further connected to the CPU for inhibiting operation when the fetch and second signals are not both present.

PREFERRED EMBODIMENT

Figure 1:
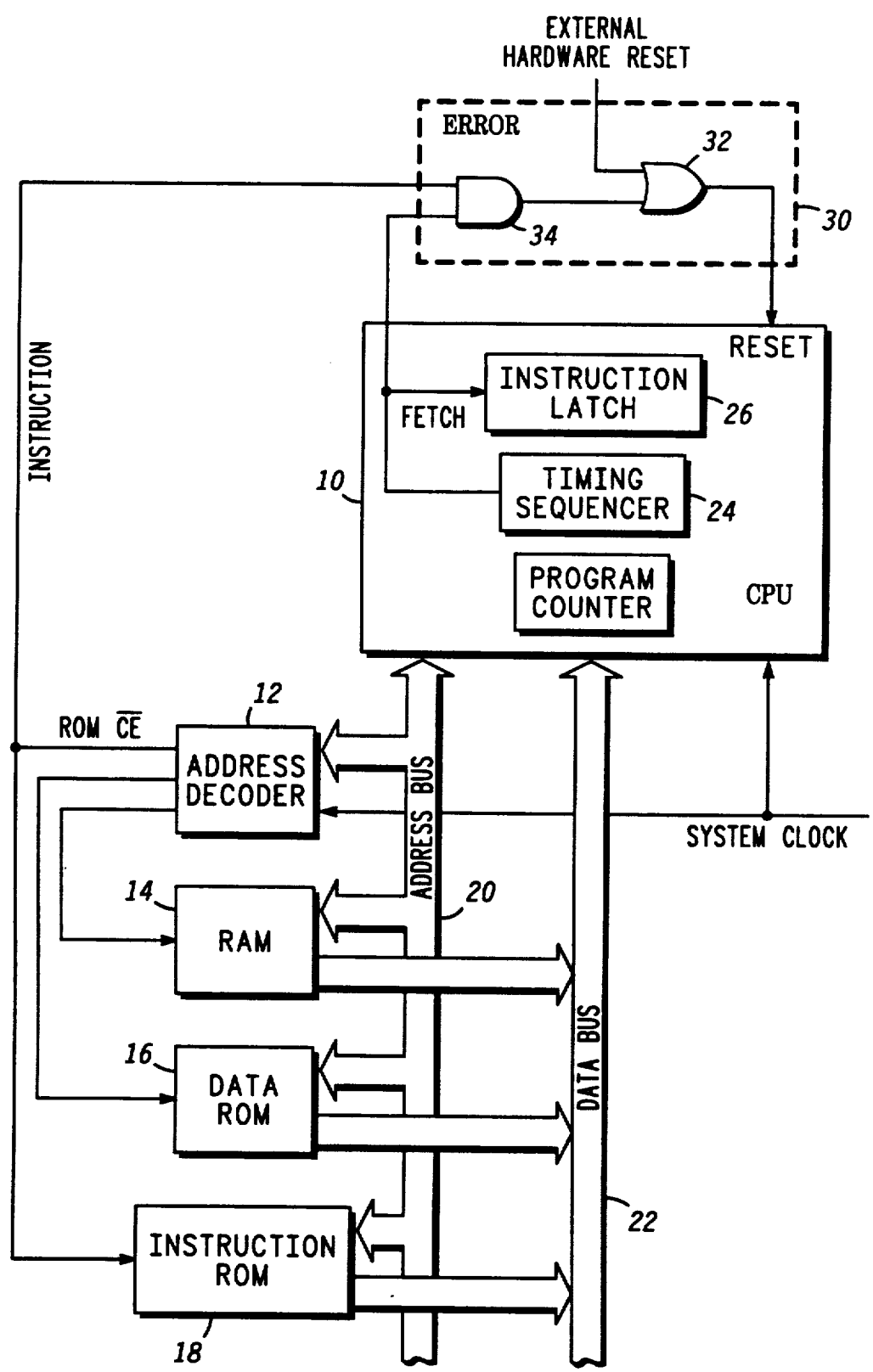
FIG. 1 is a block diagram of a microprocessor embodying the present invention.

FIG. 1 illustrates a central processing unit (CPU) 10 having an address decoder 12, a random access memory (RAM) 14, a data read-only-memory (ROM) 16, and an instruction ROM 18 connected thereto by means of an address bus 20 and a data bus 22. A system clock (not shown) supplies timing pulses to CPU 10 and address decoder 12. CPU 10 includes a timing sequencer 24 which supplies an instruction fetch signal to an instruction latch 26 upon the completion of each instruction in an operation. Instruction latch 26 receives (fetches) the next instruction from instruction ROM 18. An instruction is fetched by sending an address to address decoder 12 and memories 14, 16, and 18 by way of address bus 20. Address decoder 12 determines that it is an address for instruction ROM 18 and sends a chip enable signal, $\overline{CE}$, to instruction ROM 18. With the enable signal and address applied to instruction ROM 18, the selected instruction is supplied to instruction latch 26 by way of data bus 22.

The problem that arises is that power supply voltage drops, incoming noises, software errors, etc. can cause a malfunction. If such a malfunction occurs, the microprocessor may overrun and continue to operate using wrong instructions. When this occurs the microprocessor is running out of function and doesn't return to the proper function. In such instances the microprocessor can be destroyed. Also, persons wanting to learn the program may be able to access memories 14, 16, and 18 or insert incorrect instructions.

To overcome these problems, a logic circuit 30 is connected to CPU 10 and address decoder 12. Logic circuit 30 includes an OR gate 32 and an AND gate 34. An output of OR gate 32 is connected to the reset input of CPU 10. A first input of OR gate 32 is connected to receive reset signals from external hardware in the normal fashion. A second input of OR gate 32 is connected to receive reset signals from the output of AND gate 34. A first input of AND gate 34 is connected to receive the instruction fetch signal from timing sequencer 24. A second input of AND gate 34 is connected to receive the chip enable signal from address decoder 12.

Figure 3:
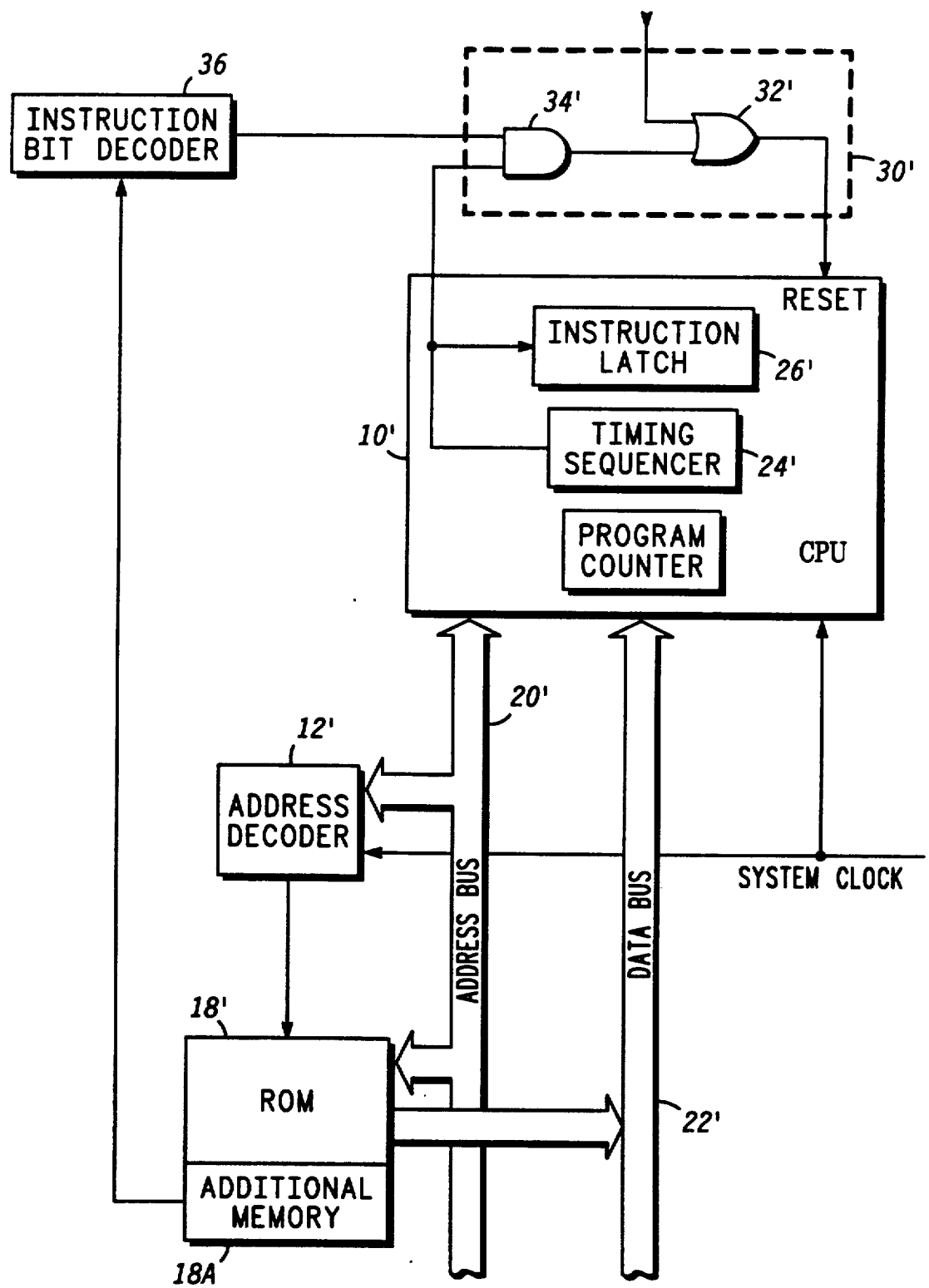
FIG. 3 is a block diagram of a microprocessor including a different embodiment of the present invention.

FIG. 3 illustrates a second embodiment of the invention. Parts similar in connection and operation to those described in FIG. 1 are numbered with similar numbers, but a prime is added to indicate a different embodiment. In this embodiment information ROM 18' may contain instructions and bytes of data and has additional memory 18A, which may be part of the same ROM or an additional component. An instruction bit decoder 36 receives identification bits from additional memory 18A whenever information bytes in information ROM 18' are accessed. Detector 36 determines from the identification bits whether it is an instruction that has been accessed and, if it is, sends a signal to the second input of AND gate 34'. This input of AND gate 34' is not connected to address decoder 12' in this embodiment.

OPERATION OF THE INVENTION

Figure 2:
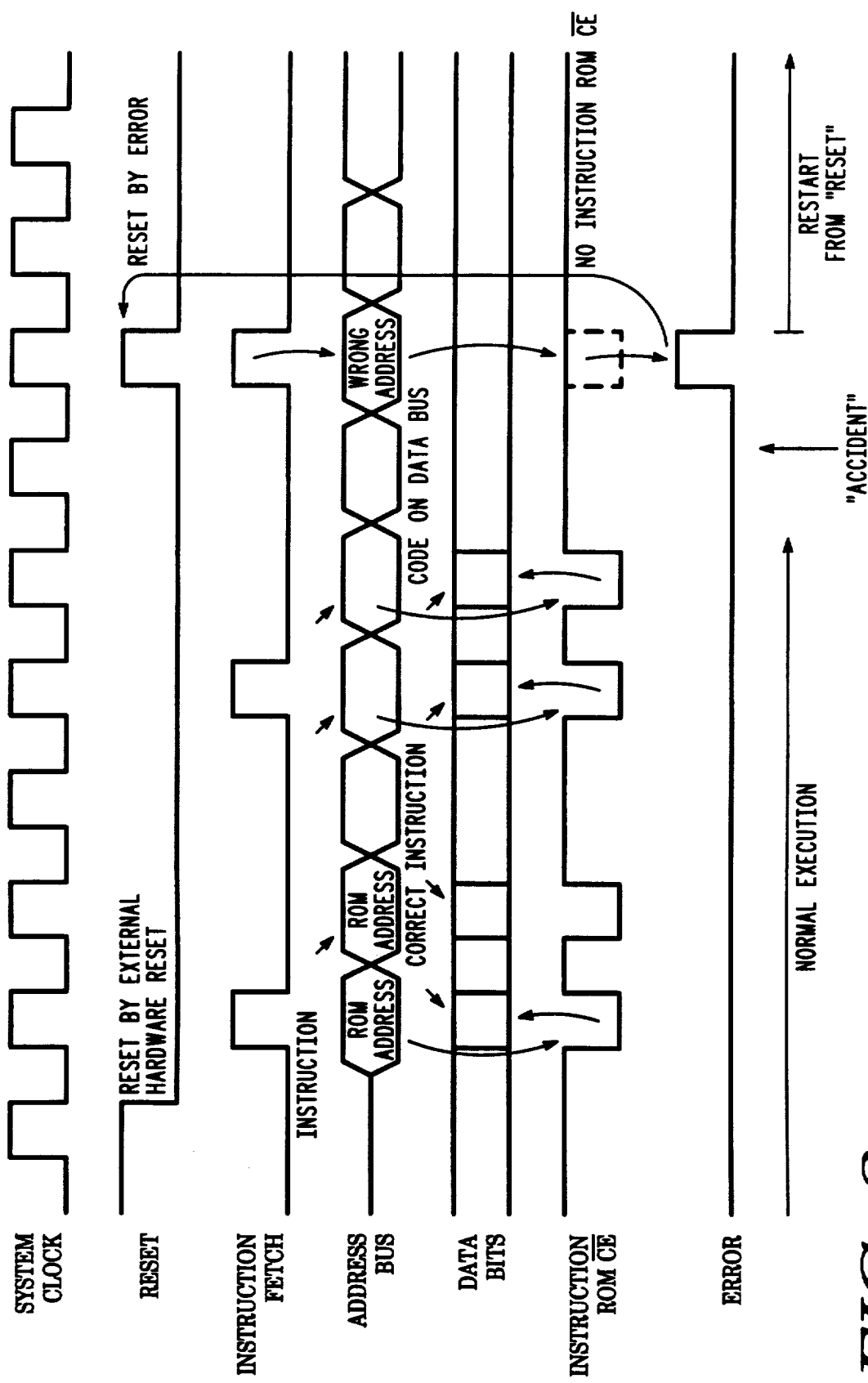
FIG. 2 is a timing chart illustrating the timing of various waveforms available at different points in the microprocessor of FIG. 1.

Referring to FIG. 1, when timing sequencer 24 sends a fetch signal to instruction latch 26, the fetch signal is also supplied to the first input of AND gate 34. Simultaneously, the adress for the selected instruction is sent by address bus 20 to address decoder 12 and memories 14, 16, and 18. Address decoder 12 detects the address and sends a $\overline{CE}$ signal to instruction ROM 18 and to the second input of AND gate 34. At this time the instruction is available for fetching by CPU 10. ROM 18 is enabled by $\overline{CE}$ and sends the selected instruction to instruction latch 26 by way of data bus 22. Simultaneously, $\overline{CE}$, which is a low level signal (see FIG. 2), prevents AND gate 34 from supplying an error signal to OR gate 32.

If CPU 10 sends a fetch signal and the correct address is not detected by address decoder 12, $\overline{CE}$ will not be generated and AND gate 34 will produce an error signal which will reset CPU 10. Any attempts, either intentional or accidental, to improperly sequence the data or instructions will result in CPU 10 being inhibited. Thus, overruns and other improper functions are inhibited.

Referring to FIG. 3, timing sequencer 24' supplies a fetch signal to AND gate 34'. Simultaneously, the address of the selected instruction is sent to address decoder 12' and ROM 18'. Address decoder 12' enables ROM 18' and the selected instruction is supplied to CPU 10' by way of data bus 22'. Also, one or more identifier bits, associated with the selected instruction, are sent to instruction bit decoder 36 from additional memory 18A. If the identifier bits are detected as identifying an instruction byte, (i.e. an instruction is available) detector 36 sends a low level signal to AND gate 34' to prevent it from sending an error signal to OR gate 32'. The identifier bits can be virtually and desired code which will identify the fact that an instruction byte (and not a data byte, etc.) has been sent by ROM 18'.

EFFECT OF THE INVENTION

As explained above, this invention prevents overruns and operation of a microprocessor out of function. The invention increases copy protection and reliability since the CPU will be reset if the proper instructions are not supplied at the correct times. Further, if a power supply voltage drop, incoming noise, software errors, etc. cause a malfunction between the CPU and the associated memories, the CPU will be reset. This invention is especially suitable for use with single chip microprocessors, such as in IC cards and the like.

What is claimed:

1. A microprocessor with protective instruction fetch apparatus comprising:
    a central processing unit (CPU) including means for fetching selected instructions from a memory and providing a first signal each time an instruction is to be fetched;
    a memory coupled to said CPU for storing a plurality of instructions and supplying selected instructions to said CPU in response to predetermined signals;
    signal circuitry coupled to said memory for providing a second signal when a selected instruction is available for fetching from said memory by said CPU; and
    logic circuitry connected to receive the first and second signals and further connected to said CPU for supplying signals to said CPU which stops the operation of said CPU when the first and second signals are not both present causing said CPU to be reset to an initial instruction.

2. A microprocessor with protective instruction fetch apparatus as claimed in claim 1 wherein the signal circuitry include an enable signal generating circuit.

3. A microprocessor with protective instruction fetch apparatus as claimed in claim 1 wherein the signal circuitry include additional memory having stored therein identification bits associated with stored information in the memory.

4. A microprocessor with protective instruction fetch apparatus as claimed in claim 3 wherein the information in the memory includes bytes of data and instructions and the stored information bits include at least one bit associated with each byte of data and instruction for identifying the bytes of data from the bytes of instructions.

5. A microprocessor with protective instruction fetch apparatus as claimed in claim 4 wherein the signal circuitry include a detector for detecting bytes of instruction and providing an output signal in response thereto.

6. A microprocessor with protective instruction fetch apparatus comprising:
    a central processing unit (CPU) including timing circuitry for providing an instruction fetch signal and circuitry for providing address signals;
    a memory for storing a plurality of instructions for the operation of said CPU, said memory including an enable input and an instruction output;
    an enable signal generator connected to receive system clock pulses and address signals, for generating enable signals at predetermined times, the enable signals being supplied to said memory; and
    logic circuitry connected to receive the instruction fetch signal provided by said CPU and the enable signals generated by said enable signal generator for supplying stop signals to said CPU when the instruction fetch signal and the enable signal are not both present causing said CPU to be reset to an initial instruction

* * * * *